United States Patent
Navarette et al.

(10) Patent No.: US 9,674,063 B2
(45) Date of Patent: Jun. 6, 2017

(54) MANAGING DATA USAGE OF A COMPUTING DEVICE

(75) Inventors: Robert W Navarette, Pasadena, TX (US); Adrian L Tuttle, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 143 days.

(21) Appl. No.: 14/347,488

(22) PCT Filed: Sep. 28, 2011

(86) PCT No.: PCT/US2011/053604
§ 371 (c)(1),
(2), (4) Date: Mar. 26, 2014

(87) PCT Pub. No.: WO2013/048381
PCT Pub. Date: Apr. 4, 2013

(65) Prior Publication Data
US 2014/0317284 A1    Oct. 23, 2014

(51) Int. Cl.
G06F 15/173 (2006.01)
H04L 12/26 (2006.01)
G06F 11/34 (2006.01)
H04L 29/08 (2006.01)

(52) U.S. Cl.
CPC ........ H04L 43/0876 (2013.01); G06F 11/349 (2013.01); H04L 67/06 (2013.01); G06F 11/3433 (2013.01); G06F 2201/81 (2013.01)

(58) Field of Classification Search
CPC .... H04L 43/0876; H04L 67/06; G06F 11/349; G06F 2201/81; G06F 11/3433
USPC .................................. 709/203, 224, 221, 235
See application file for complete search history.

(56) References Cited

U.S. PATENT DOCUMENTS

| | | | |
|---|---|---|---|
| 4,950,913 A * | 8/1990 | Kephart | 307/10.7 |
| 5,835,765 A * | 11/1998 | Matsumoto | 718/102 |
| 7,069,018 B1 * | 6/2006 | Granstam | H04M 1/663 455/414.1 |
| 7,171,482 B2 | 1/2007 | Jones, Jr. et al. | |
| 7,490,045 B1 * | 2/2009 | Flores et al. | 705/1.1 |
| 7,725,898 B2 | 5/2010 | Chew | |
| 7,944,901 B2 | 5/2011 | Souissi et al. | |
| 8,009,608 B2 | 8/2011 | Karaoguz et al. | |
| 8,199,155 B2 * | 6/2012 | Leroy et al. | 345/502 |
| 8,255,528 B2 * | 8/2012 | Raja et al. | 709/224 |
| 8,280,456 B2 * | 10/2012 | Hackborn et al. | 455/574 |

(Continued)

FOREIGN PATENT DOCUMENTS

CN            101888707 A        11/2010

OTHER PUBLICATIONS

Exinda, "Controlling Peer-to-Peer and Recreational Internet Traffic," 2009, 8 pages, <http://www.solutioninc.com/Images/P2PWhitePaper.pdf>.

(Continued)

Primary Examiner — Michael Y Won
(74) Attorney, Agent, or Firm — HP Patent Department (57) ABSTRACT

Example embodiments disclosed herein relate to managing data usage of a computing device. In example embodiments, an executable component of a computing device is managed, wherein the executable component is to communicate data with a network interface of the computing device.

13 Claims, 5 Drawing Sheets

(56) References Cited

U.S. PATENT DOCUMENTS

| | | | | |
|---|---|---|---|---|
| 8,601,493 | B2* | 12/2013 | Minemura | G06F 9/485 714/100 |
| 8,646,107 | B1* | 2/2014 | Hanson | 726/34 |
| 8,745,191 | B2* | 6/2014 | Raleigh et al. | 709/223 |
| 8,924,542 | B1* | 12/2014 | Gabrielson et al. | 709/224 |
| 2002/0174235 | A1 | 11/2002 | Likourezos | |
| 2003/0115316 | A1 | 6/2003 | Yang-Huffman | |
| 2003/0154272 | A1 | 8/2003 | Dillon et al. | |
| 2003/0224781 | A1* | 12/2003 | Milford et al. | 455/426.1 |
| 2004/0039809 | A1 | 2/2004 | Ranous et al. | |
| 2004/0199733 | A1 | 10/2004 | Watanabe et al. | |
| 2004/0203686 | A1* | 10/2004 | Bahr | 455/418 |
| 2005/0090248 | A1 | 4/2005 | Shen et al. | |
| 2005/0257251 | A1* | 11/2005 | McKune | G06F 21/10 726/4 |
| 2006/0087981 | A1* | 4/2006 | Sengupta et al. | 370/252 |
| 2006/0136916 | A1 | 6/2006 | Rowland et al. | |
| 2007/0104169 | A1 | 5/2007 | Polson | |
| 2008/0028391 | A1* | 1/2008 | Nallipogu et al. | 717/174 |
| 2008/0204460 | A1* | 8/2008 | Marinkovic et al. | 345/502 |
| 2008/0256630 | A1* | 10/2008 | Fujikawa | H04N 1/00411 726/21 |
| 2009/0248927 | A1 | 10/2009 | Hacking et al. | |
| 2009/0265348 | A1 | 10/2009 | Elteto | |
| 2009/0282127 | A1* | 11/2009 | Leblanc | H04L 12/5695 709/219 |
| 2010/0034178 | A1 | 2/2010 | Bhar | |
| 2010/0122334 | A1 | 5/2010 | Stanzione et al. | |
| 2010/0198447 | A1* | 8/2010 | Maier et al. | 701/29 |
| 2010/0328081 | A1* | 12/2010 | Hu et al. | 340/586 |
| 2011/0086610 | A1* | 4/2011 | Baldwin | H04M 15/00 455/405 |
| 2011/0145920 | A1* | 6/2011 | Mahaffey | G06F 21/564 726/22 |
| 2012/0101952 | A1* | 4/2012 | Raleigh et al. | 709/223 |
| 2012/0196566 | A1* | 8/2012 | Lee et al. | 455/408 |
| 2012/0203882 | A1* | 8/2012 | Ohashi | 709/223 |
| 2012/0302204 | A1* | 11/2012 | Gupta | H04M 15/44 455/406 |
| 2013/0007245 | A1* | 1/2013 | Malik et al. | 709/223 |
| 2013/0132559 | A1* | 5/2013 | Kotecha | H04L 43/0876 709/224 |
| 2013/0196615 | A1* | 8/2013 | Zalmanovitch | H04W 24/02 455/405 |
| 2013/0231080 | A1* | 9/2013 | Cheuk et al. | 455/405 |
| 2014/0122859 | A1* | 5/2014 | Ruelas | 713/2 |
| 2014/0149562 | A1* | 5/2014 | Xiao | H04L 41/0879 709/222 |
| 2014/0244191 | A1* | 8/2014 | Oka et al. | 702/61 |
| 2014/0248864 | A1* | 9/2014 | Rangarajan et al. | 455/418 |
| 2014/0310403 | A1* | 10/2014 | Weiss | H04L 41/0813 709/224 |
| 2014/0317284 | A1* | 10/2014 | Navarette et al. | 709/224 |
| 2015/0011182 | A1* | 1/2015 | Goldner | H04M 15/66 455/406 |
| 2015/0130276 | A1* | 5/2015 | McNeill-McCallum et al. | 307/23 |
| 2015/0133076 | A1* | 5/2015 | Brough | H04W 24/10 455/405 |
| 2015/0230152 | A1* | 8/2015 | Raleigh | H04L 41/0893 370/230 |
| 2015/0381826 | A1* | 12/2015 | Marimuthu | H04M 15/886 455/405 |

OTHER PUBLICATIONS

International Search Report and Written Opinion received in PCT Application No. PCT/US2011/053604, mailed May 14, 2012, pp. 9.
Admin, "My Data Monitor helps you keep track of your Android phone's data usage," Jul. 18, 2011: My Cell Phone Site, (web page), http://mycellphonesite.com/my-data-monitor-helps-you-keep-track-of-your-android-phones-data-usage/>.
Alan Henry, "How to track your mobile data usage and avoid carrier caps," Jul. 6, 2011, http://www.extremetech.com/mobile/89132-how-to-track-your-mobile-data-usage-and-avoid-carrier-caps/>.
Android Developers, "Gingerbread," Dec. 6, 2010, <http://developer.android.com/about/versions/android-2.3-highlights.html>.
Anonymous, "Data Control App," Aug. 25, 2011, Panda App, (web page), <http://web.archive.org/web/20110825144917/http://download.pandaapp.com/ios-iphone-app/datacontrolapp2.03-id12202.html>.
Anonymous, "Download Meter for Wi-Fi/ 3G/ EDGE/ GPRS—reduce spending on mobile Internet," Aug. 25, 2011, Panda App, (web page <http://web.archive.org/web/20110828023524/http://download.pandaapp.com/ios-iphone-ipad-app/downloadmeter4.1-id8237.html>.
Comcast Interactive Media. "Data Usage Meter," Aug. 14, 2011, <http://web.archive.org/web/20110814134106/http://networkmanagement.comcast.net/datausagemeter.htm>.
Cubic Telecom US. inc., "Welcome to HP DataPass!," available Aug. 2011, <http://datapass.peregrinenet.com>.
Ed Burnette, "Top 10 features in Android 2.3 (Gingerbread)," Dec. 7, 2010, ZDNet, <http://www.zdnet.com/article/top-10-features-in-android-2-3-gingerbread/>.
Google ,"Accounts" Android 2.3.4 User's Guide, May 20, 2011, pp. 1-2 and 127-134, <http://static.googleusercontent.com/media/www.google.com/en/us/help/hc/pdfs/mobile/AndroidUsersGuide-2.3.4.pdf?hl=en&rd=1>.
Google ,"Optimizing battery life," Android 2.3.4 User's Guide, May 20, 2011, pp. 1-2 and 47-48, <http://static.googleusercontent.com/media/www.google.com/en/us/help/hc/pdfs/mobile/AndroidUsersGuide-2.3.4.pdf?hl=en&rd=1>.
Google, "Settings," Android 2.3.4 User's Guide. May 20, 2011, pp. 1-2 and 357-384, <http://static.googleusercontent.com/media/www.google.com/en/us/help/hc/pdfs/mobile/AndroidUsersGuide-2.3.4.pdf?hl=en&rd=1>.
Hewlett-Packard Development Company, L.P., "HP Connection Manager," Nov. 2010, <https://www.advance.no/Pdf.aspx?id=926>.
Hewlett-Packard Development Company, L.P., "HP DatePass Frequently Asked Questions," available Aug. 2011, <http://www.hp.com/sbso/wireless/datapass-faqs.pdf>.
Hewlett-Packard Development Company, L.P., "HP DataPass Get Connected," Data Sheet, available Aug. 2011, <http://www.hp.com/sbso/wireless/hp-datapass-datasheet.pdf>.
InfoTech, "Best Track Data Usage Apps for Android Phone," Jul. 9, 2011, (web page), <http://www.infotechblogs.com/2011/07/data-usage-apps-for-android-phone.html>.
International Preliminary Report on Patentability received in PCT Application No. PCT/US2011/053604, Apr. 10, 2014, 6 pages.
James Kendrick, "HP DataPass brings prepaid 3G data to business laptop users," May 9, 2011, ZDNet, <http://www.zdnet.com/article/hp-datapass-brings-prepaid-3g-data-to-business-laptop-users/>.
JR Raphael, "Android Gingerbread: The complete FAQ," Dec. 6. 2010, Computerworld, <http://www.computerworld.com/article/2469757/mobile-apps/android-gingerbread--the-complete-faq.html>.
KebabApps, "Llama—Location Profiles," Aug. 30, 2011, <http://www.appbrain.com/app/llama-location-profiles/com.kebab.Llama>.
Kevin Purdy, "APNdroid 2.0 Adds Automation to Android Battery Saving Tool," Dec. 21, 2009, Lifehacker, (Web page), <http://web.archive.org/web/20110828203119/http://lifehacker.com/5430864/apndroid-20-adds-automation-to-android-battery-saving-tool>.
Kevin Purdy, "How to Keep Track of Your Cellphone Data Usage," Jun. 8, 2010, Lifehacker, (web page), <http://web.archive.org/web/20110816175956/http://lifehacker.com/5557836/the-best-tools-for-monitoring-your-cellphone-data-usage>.
Kevin Purdy, "Our Biggest Android Annoyances and How to Fix Them," Jan. 20, 2011, LifeHacker, <http://lifehacker.com/5738881/our-biggest-android-annoyances-and-how-to-fix-them>.
Kevin Purdy, "Push Your Automated Android to Awesome Heights with These Tasker Setups," Aug. 3, 2010, <http://lifehacker.com/5601133/push-your-automated-android-to-awesome-heights-with-these-tasker-setups#profiles>.

(56) References Cited

OTHER PUBLICATIONS

Know Your Cell, "How to monitor your data usage on AT&T," Jun. 3, 2010, (web page), <http://www.knowyourcell.com/features/498563/how_to_monitor_your_data_usage_on_alt.html>.

Locktime Software s.r.o., "NetLimiter 3 feature list and comparison table," Aug. 25, 2011, <http://web.archive.org/web/20110829151442/http://www.netlimiter.com/featurelistnl3.php>.

Marguerite Reardon, "No unlimited data plan? Help! (FAQ)," Jul. 7, 2011, CNET, (web page), <http://www.cnet.com/news/no-unlimited-data-plan-help-faq/>.

Michael Ludwig, "DroidStats," Aug. 25, 2011, Android Market, <https://market.android.com/details?id=nitro.phonestats&feature=search_result>.

Microsoft, "Changing Service State," Jan. 8, 2010, (web page), <http://web.archive.org/web/20100108004631/http://technet.microsoft.com/en-us/library/ee198751.aspx>.

Onavo, "App Guide," Onavo Lite for Android, Aug. 30, 2011, <http://www.onavo.com/apps/android>.

Onavo, "Onavo Lite—Data Cost Control," Aug. 30, 2011, <https://market.android.com/details?id=com.onavo.android.onavoid>.

Onavo, "Onavo Lite for Android," Aug. 30, 2011, <http://www.onavo.com/apps/android>.

Paul et al., "New Free Utility—NoData Disable GPRS connections for when you're abroad," Sep. 2006, <http://www.modaco.com/topic/246171-new-free-utility-nodata/>.

Peregrine Network, Inc., "HP DataPass Mobile Broadband," 2010, User Guide, <http://4ezf8ck03yd3zzf6037xez2x.wpengine.netdna-cdn.com/wp-content/uploads/2011/05/HP_DataPass_User_Guide.pdf>.

Rene Ritchie, "How to: Keep Track of Your Data Usage With iPhone 3G," Jul. 13, 2008, (web page), <http://www.tipb.com/2008/07/13/how-to-keep-track-of-your-data-usage-with-iphone-3g/>.

Roi Carthy, "Onavo—The Must-Have Data Shrinking iOS App—Comes to Android," Aug. 30, 2011, <http://techcrunch.com/2011/08/30/onavo-android/>.

Saad Sadiq, "Keep Track of Your Calls, Text Messages, and Data Usage in Android," Sep. 22, 2010, <http://www.addictivetips.com/mobile/how-to-check-android-data-usage-stats/>.

Tarandeep Singh, "Throttle Internet Bandwidth on Windows," Mar. 18, 2010, Geeknizer, (web page), <http://web.archive.org/web/20110820012852/http://geeknizer.com/windows-bandwidth-throttle/>.

Tasker Wiki, "Juice Defender inspired Battery saving," Aug. 30, 2011, (web page), <http://tasker.wikidot.com/juice-defender-inspired-battery-saving>.

Tacker Wiki, "Juice Defender inspired Battery saving," Aug. 30, 2011, (web page), <http://tasker.wikidot.com/juice-defender-inspired-battery-saving>.

Tasker, "Tasker: Total Automation for Android," Aug. 30, 2011, <http://tasker.dinglisch.net/index.html>.

Tasker, "Tasker: Tour," Aug. 30, 2011, (web page), <http://tasker.dinglisch.net/tour.html>.

Than Hacun, "Balance Wifi Usage and Data Check (Update)," Aug. 11, 2011, <http://web.archive.org/web/20110811221428/http://tasker.wikidot.com/balance-wifi-usage-and-data-check-update>.

TheTechDad, "How to track data usage on your smartphone," Sep. 27, 2011, <http://web.archive.org/web/20110927040354/http://theonlinemom.com/secondary.asp?id=1911&t=how-to-track-data-usage-on-your-smartphone>.

Wikipedia, "Access Point Name," Aug. 29, 2011, <https://en.wikipedia.org/w/index.php?title=Access_Point_Name&oldid=447257527>.

* cited by examiner

MANAGING DATA USAGE OF A COMPUTING DEVICE

BACKGROUND

A computing device such as a desktop computer, notebook computer, tablet computer, mobile phone, or smart device may include a network interface enabling the computing device to connect to a computer network such as the internet. Additionally, computing devices are often connected to a computer network through the resources of a service provider. The service provider may charge for this network access based on the amount of data transmitted between the network and the computing device via the service provider's resources. Moreover, some computing devices include multiple network interfaces of different types enabling the computing device to connect to a computer network in different ways and even through different services providers.

BRIEF DESCRIPTION OF THE DRAWINGS

The following detailed description references the drawings, wherein.

DETAILED DESCRIPTION

As noted above, a service provider may charge for network access based on the amount of data transmitted between the computing device and the network via the service provider's resources. It may be beneficial for a user to manage such data usage via the service provider's resources in order to manage costs. However, background processes running on the computing device may communicate with a computer network without the users knowledge. Additionally, a user may not appreciate the rate at which a particular application consumes data from a computer network such as the internet. As such, it may be difficult for computing device users to manage a device's data usage over a particular service providers resources. Moreover, under certain data plans, a service provider may, for example, restrict a user to an amount of data for which the user has pre-paid, or charge for each unit of data consumed over a specified data usage limit per billing cycle. Accordingly, when approaching a data usage limit, it may be beneficial for a user to manage computing device data usage differently than at other times.

To address these issues, examples disclosed herein provide computing device tools that may be used to manage the computing device's data usage by managing executable components of the computing device that may communicate with a computer network via a network interface and thus consume data. For example, some examples disclosed herein enable a computing device approaching a data usage limit to determine which of the executable components to restrict or disable. In some examples, a user may be prompted to select, from a list of running executable components, which executable components to disable or restrict. In other examples, the computing device may restrict or disable certain executable components identified on a list when approaching the data usage limit.

By restricting or disabling executable components that may communicate with a computer network when approaching a data usage limit, the computing device may help prevent the user from inadvertently reaching or exceeding the data usage limit. In this manner, examples disclosed herein may help a user to reduce costs associated with exceeding a data usage limit. Additionally, examples disclosed herein may provide an improved experience for users of pre-paid data plans by helping the user prevent reaching a pre-paid limit at an inopportune time.

As used herein, "data usage" is an amount of data communicated between a computing device and a computer network, and may refer to the amount of data communicated using a particular network interface of the computing device or a total amount of data communicated via all network interfaces of the computing device. Additionally, as used herein, the "communication" of data between a computing device and a communications network may refer to uploading or downloading data with the computing device, just uploading data, or just downloading data.

Figure 1:
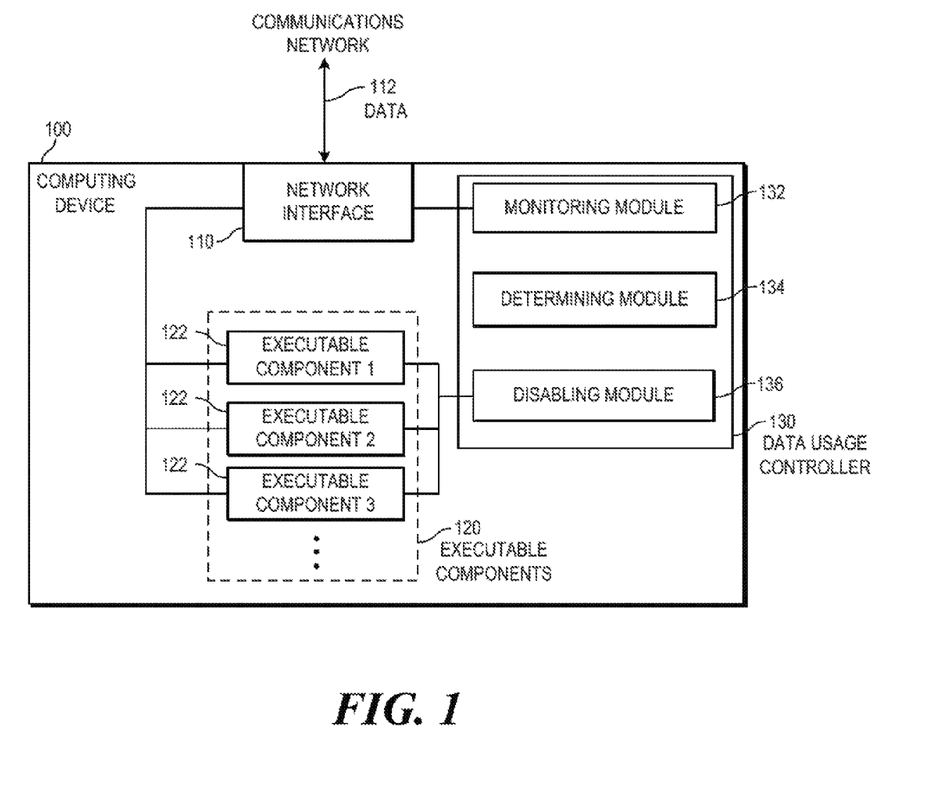
FIG. 1 is a block diagram of an example computing device for managing data usage.

Referring now to the drawings, FIG. 1 is a block diagram of an example computing device 100 for managing data usage. As used herein, a "computing device" is a desktop computer, a notebook computer, a slate or tablet computer, a mobile phone, a smart device (e.g., a smartphone), a chip set, of a computing system, or any other device capable of using a network interface to communicate with a communications network. In some examples, computing device 100 may be any of the computing devices noted above. In the example of FIG. 1, computing device 100 includes a network interface 110, a plurality 120 of executable components 122, and a data usage controller 130.

As used herein, a "network interface" is at least one hardware component that may be used by a computing device to communicate with at least one remote resource of a communications network including at least one computer network, at least one telephone network, or a combination thereof. In some examples, suitable computer network include, for example, a local area network (LAN), a wireless local area network (WLAN), a wide area network (WAN), a wireless wide area network (WWAN), an enterprise private network, a virtual private network (VPN), the internet, and the like. Example network interfaces that may be used to connect to such computer networks include a wired network interface controller (NIC), a wireless NIC, and the like. Suitable telephone networks include, for example, a wired telephone network, a wireless telephone network (e.g., a cellular network), a mobile broadband network, and the like. Example network interfaces that may be used to connect to such telephone networks include mobile broadband modules of any generation (e.g., 3G, 4G, etc.), and the like.

The plurality 120 of executable components 122 may include any number of executable components 122. In the example of FIG. 1, the plurality 120 includes at least first, second, and third executable components 122, as shown in FIG. 1. In other examples, the plurality 120 may include more or fewer executable components 122. As used herein, "executable component" means information including a set of machine-readable instructions executable by a processor of the computing device to perform at least one task. An executable component may be, for example, any one of a computer application (e.g., an "app"), a computer service (e.g., a system service), a computer plug-in, and the like.

In some examples, a computer application may have a user interface and may perform tasks in response to user input. Example computer applications include web browsers, electronic mail clients, media players, and the like. In some examples, a computer service may be a system service having no user interface and may perform at least one task without user input. An operating system update service is an example of a computer service. In some examples, a computer plug-in is information including a set of machine-readable instructions executable by a processor that adds at least one functionality to a computer application. For example, a computer plug-ire may add to a web browser the ability to play a video file of a particular format where the web browser application alone is not able to play video of the particular format.

In the example of FIG. 1, each executable component 122 of the plurality 120 is able to utilize network interface 110 to communicate data 112 between the executable component 122 and a communications network outside of computing device 100. In some examples, each executable component is able to utilize network interface 110 to communicate data between the executable component and a remote resource of the communications network. For example, one executable component 122 may be a web browser able to utilize network interface 110 to download data from a web server that is part of the communications network.

Data usage controller 130 includes a monitoring module 132, a determining module 134, and a disabling module 136. In the example of FIG. 1, data usage controller 130 may comprise at least one hardware device including electronic circuitry for implementing the functionality of modules 132, 134, and 136. Alternatively, the functionality of modules 132, 134, and 136 may be implemented as a series of instructions encoded on a machine-readable storage medium of computing device 100 and executable by a processor of computing device 100. In other examples, some functionality of the modules may be implemented as electronic circuitry while the other functionality of the modules is implemented as executable instructions.

In the example of FIG. 1, monitoring module 32 may monitor an amount of data communicated with network interface 110. In some examples, module 132 monitors the total amount of data communicated with network interface 110, including data downloaded and data uploaded with network interface 110. In other examples, module 132 may monitor only data downloaded or only data uploaded with network interface 110. Determining module 134 may determine whether the amount of data communicated with network interface 110 enters within a threshold range of a network interface data usage limit for computing device 100. As used herein, a "network interface data usage limit" is at least one value that represents or indicates a total amount of data that a computing device is permitted to communicate (e.g., upload and/or download) via at least one network interface of the computing device.

In some examples, the network interface data usage limit is defined as a particular amount of data. For example, a network interface data usage limit may correspond to an amount of data for which a user has pre-paid a service provider for the use of the service provider's resources via the network interface. In such examples, if a user has paid for the use of 2 gigabytes (GB) of data using a service provider's resources, the network interface data usage limit may be 2 GB. In some examples, the threshold range may be defined by a threshold that is a percentage, such as 75%, of the network interface data usage limit. In such examples, determining module 134 may determine, that the amount of data communicated with network interface 110 enters within the threshold range when the amount of data communicated is greater than 75% of the data usage limit (i.e., greater than 1.5 GB). In such examples, network interface 110 may be, for example, a mobile broadband module (e.g., a 3G card, or the like) capable of connecting to the internet via a telephone network (e.g., a cellular network) of the service provider. Additionally, in some examples, the network interface data usage limit may be stored on computing device 100.

In other examples, the network interface data usage limit may correspond to an amount of data a user may communicate during a certain time period (e.g., a billing cycle, etc.) without incurring additional charges from a service provider. For example, a user may have a service contract under which the user may communicate 1 GB of data with the service provider's resources each month without incurring additional charges. In such examples, the network interface data usage limit may be 1 GB. In some examples, the threshold range may be defined by a threshold that is an absolute amount of data, such as 800 megabytes (MB). In such examples, determining module 134 may determine that the amount of data communicated with network interface 110 enters within the threshold range when the amount of data communicated is greater than 800 MB. In other examples the threshold may be a lower threshold, such as 10 MB, and module 134 may determine, that the amount of data communicated with network interface 110 enters within the threshold range when less than 10 MB remains before reaching the network interface data usage limit.

In some examples, the threshold range may be defined by a threshold stored on the computing device. As used herein, a "threshold" is at least one value that defines at least one boundary of the threshold range of the network interface data usage limit. For example, the threshold may be a percentage of the network interface data usage limit. In some examples, the threshold percentage (e.g., 75%, 85%, 90%, etc.) may indicate an amount of data that may be used before entering the threshold range. For example, module 134 may determine that the amount of data communicated with network interface 110 has entered within the threshold range when the amount exceeds the threshold percentage of the network interface data usage limit. In other examples, the threshold may be an absolute amount of data less than the network interface data usage limit. In some examples, module 134 may derive the absolute amount from a threshold percentage. In other examples, the threshold may indicate a lower limit for the amount of data that may be communicated with network interface 110 before using the entire amount of data defined by the network interface data usage limit. In such examples, the lower limit threshold may be, for example, a percentage (e.g., 5%, 10%, 25%, etc.), an absolute amount of data (e.g., 10 MB, 50 MB, etc.), or an absolute amount of data derived from a stored percentage. In such examples, module 134 may determine that the amount of data communicated with network interface 110 has entered within the threshold range when the amount data that may be communicated before reaching the network interface data usage limit is less than the threshold percentage or amount. In some examples, the threshold may be set by a user of computing device 100.

If module 134 determines that the amount of data communicated with network interface 110 enters within the threshold range, then module 134 may determine which of executable components 122 to disable. In some examples, module 134 may determine which of executable components 122 to disable by receiving, as input from a user of computing device 100, a selection of running executable components 122 to disable. For example, if the amount of data communicated with network interface 110 enters within the threshold range, module 134 may, in response, prompt a user with a list of running executable components 122. In response, the user may select at least one of the executable components 122, and module 134 may provide to module 136 a list of the executable components 122 selected by the user as the result of the determination of which executable components to disable.

In other examples, computing device 100 may store a usage limiting list identifying executable components 122 to disable upon entering the threshold range. In such examples, module 134 may determine which of executable components 122 to disable by accessing the usage limiting list. For example, module 134 may provide to module 136, as a result of the determination of which executable components 122 to disable, a list identifying the executable components 122 that are identified in the usage limiting list and that are running. In other examples, module 134 may determine which executable components to disable based on both user input, as described above, and the usage limiting list. In such examples, module 134 may provide module 136 a list identifying the executable components 122 selected by the user and the running executable components 122 included in the usage limiting list. In some examples, a user of computing device 100 may populate the usage limiting list with selected executable components 122.

In the example of FIG. 1, disabling module 136 may disable at least one of the executable components 122 of the plurality 120 based on the result of the determination, made by module 134, of which of the executable components to disable. For example, when module 134 provides module 136 a list identifying at least one executable component 122, as described above, module 136 may disable ail of the executable components 122 identified in the list returned. As used herein, to "disable" an executable component of a computing device means to terminate an executing or running executable component or to pause the execution of the executable component such that execution of the executable component may be resumed from the point in execution at which it was paused. In other examples, in addition to disabling at least one executable component 122, module 136 may discontinue a functionality of at least one other executable component 122, wherein performance of the functionality of the at least one executable component 122 includes communicating data, with network interface 110, between the executable component 122 and a communications network.

In the examples described above, the computing device may disable at least one executable component able to utilize the network interface of the computing device when the amount of data communicated with the network interface enters within a threshold range of a network interface data usage limit. In this manner, the computing device may reduce the rate at which the computing device communicates data with the network interface as the computing device approaches the network interface data usage limit. By allowing the user to select executable components to disable, the computing device may reduce the rate of data communication without hindering tasks considered by the user to have a high priority. For example, when approaching a network interface data usage limit, a user may select to disable background executable components (e.g., automatic update programs) that do not affect the user's ability to browse web pages or send and receive e-mail messages with the computing device's remaining data usage allotment. In other examples, the usage limiting list may be populated with low-priority executable components (e.g., automatic update or other background programs) and/or executable components having a high data usage rate (e.g., media streaming applications, etc.). In this manner, the computing device of examples described above may help a user to reduce costs associated with limited data plans and/or improve the experience of using a limited data plan.

Figure 2:
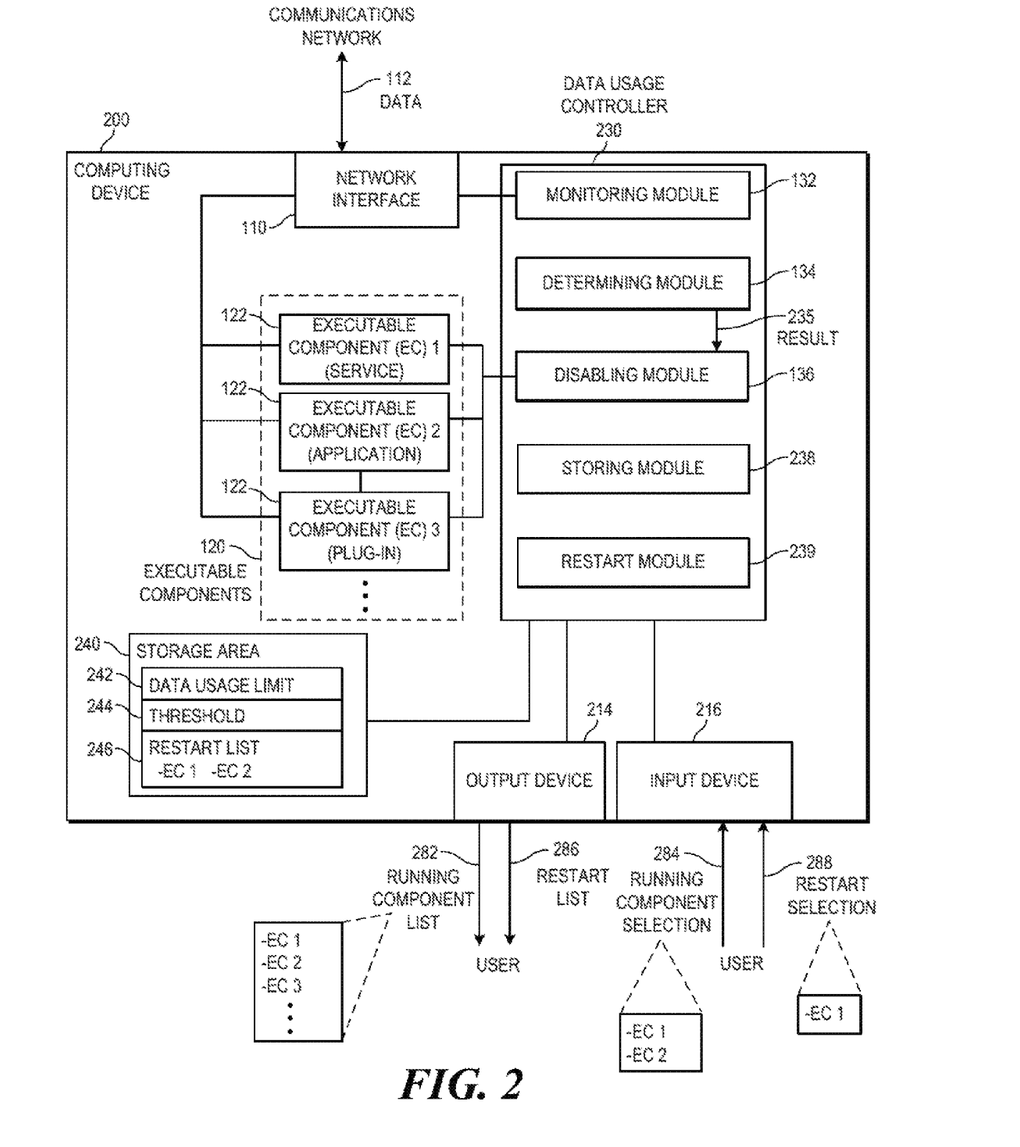
FIG. 2 is a block diagram of an example computing device for managing data usage by executable components of the computing device.

FIG. 2 is a block diagram of an example computing device 200 for managing data usage by executable components 122 of computing device 200. In the example of FIG. 2, computing device 200 includes a network interface 110 and a plurality 120 of executable components 122, as described above in relation to FIG. 1. As described above, network interface 110 may communicate data 112 with a communications network. Among the plurality 120, FIG. 2 illustrates first, second, and third executable components 122. Plurality 120 may include more or fewer executable components 122 than the three illustrated in FIG. 2. In the example of FIG. 2, each executable component 122 of the plurality 120 is able to utilize network interface 110 to communicate data 112 between the executable component 122 and a communications network outside of computing device 200. Additionally, in the example of FIG. 2, first executable component 122 may be a computer service, second executable component 122 may be a computer application, and third executable component 122 may be a plug-in for the application of second executable component 122. Computing device 200 also includes a data usage controller 230, a storage area 240, an output device 214, and an input device 216.

Data usage controller 230 includes modules 132, 134, and 136 described above in relation to FIG. 1. Data usage controller 230 also includes a storing module 238 and a restart module 239. In the example of FIG. 2, data usage controller 230 may comprise at least one hardware device including electronic circuitry for implementing the functionality of modules 132, 134, 136, 238, and 239. Alternatively, the functionality of modules 132, 134, 136, 238, and 239 may be implemented as a series of instructions encoded on a machine-readable storage medium of computing device 200 and executable by a processor of computing device 200. In other examples, some functionality of the modules may be implemented as electronic circuitry while the other functionality of the modules is implemented as executable instructions.

In the example of FIG. 2, storage area 240 includes a network interface data usage limit 242, a threshold 244, and a restart list 246. As used herein, a "storage area" may comprise a number of physical media for storing data, such as at least one hard disk, solid state drive, tape drive, and the like, or any combination thereof. Additionally, any storage area described herein may include a plurality of storage devices that, in combination, form a pool of available storage. In the example of FIG. 2, output device 214 may include, for example, at least one display, speaker, or any other device capable of communicating information to a user of computing device 200. While the example of FIG. 2 includes only one output device 214, other examples may include a plurality of output devices 214. Additionally, input device 216 may include, for example, at least one button, keyboard, keypad, touch screen, pointing device (e.g., mouse), accelerometer, microphone, or any other device capable of receiving input from a user of computing device 200. While the example of FIG. 2 includes only one input device 216, other examples may include a plurality of input devices 216.

As described above in relation to FIG. 1, if module 134 determines that the amount of data communicated with network interface 110 enters within the threshold range, then module 134 may determine which of executable components 122 to disable. In the example of FIG. 2, module 134 may determine which of executable components 122 to disable by obtaining a selection of running executable components 122 to disable from a user of computing device 200. In such examples, module 134 may display or otherwise output to the user, with output device 214, a list 282 of executable components 122 currently running on computing device 200, if the amount of data communicated with network interface 110 enters within the threshold range. For example, if at least first, second, and third executable components 122 are running, then module 134 may output, with output device 214, a list 282 identifying at least the first, second and third executable components 122, as shown in the example of FIG. 2.

After displaying list 282, module 134 may receive, via input device 216, a selection 284 of at least one of the running executable components 122 included in the list 282. For example, when list 282 is displayed that identifies at least the first, second, and third executable components 122, as shown in FIG. 2, a user may input, via input device 216, a selection 284 identifying the first and second executable components 122. After receiving selection 284, module 134 may determine to disable each running executable component identified in selection 284. In such examples, module 134 may provide to module 136, as a result 235 of the determination of which executable components to disable, information identifying each of the executable components 122 selected by the user.

For example, when selection 284 received via input device 216 identifies first and second executable components 122, module 134 may determine to disable first and second executable components 122 and provide to module 136 (e.g., as result 235) a list identifying the first and second executable components 122. In other examples, computing device 200 may also store a usage limiting list identifying executable components 122 to disable upon entering the threshold range. In such examples, module 134 may provide to module 136 (e.g., as result 235) information identifying the executable components 122 selected by the user and the running executable components 122 included in the usage limiting list.

In the example of FIG. 2, disabling module 136 may disable the executable components 122 indicated by module 134 (e.g., via result 235), as described above in relation to FIG. 1. In addition, storing module 238 may store a restart list 246 identifying each executable component 122 that data usage controller 230 (e.g., disabling module 136) disables based on the result 235 of the determination made by module 134 of which executable components to disable. In the example of FIG. 2, module 238 may store restart list 246 in storage area 240. For example, if module 136 disables first and second executable components 122 based on result 235, then module 238 may store a restart list 246 identifying first and second executable components 122, as illustrated in FIG. 2. In some examples, module 238 may store the restart list 246 by creating and storing a new restart list 246 identifying the disabled executable components 122, or by updating or replacing the contents of a previously created restart list 246.

In some examples, restart module 239 may determine which of the executable components 122 identified in restart list 246 to restart, if the amount of data communicated with network interface 110 exits (or is determined to be outside of) the threshold range. The amount of data communicated with network interface 110 may exit the threshold range if, for example, the network interface data usage limit is increased, the accumulated amount of data communicated with the network interface 110 is reduced (e.g., to zero at the beginning of a new billing cycle), the threshold is adjusted, and the like. In some examples, module may receive an indication to change a current network interface data usage limit, threshold, and/or accumulated amount of data communicated with the network interface from a remote resource via network interface 110 or from a user via input device 216. In such examples, module 239 may determine that the amount of data communicated with network interface 110 has exited or outside of the threshold range in response to the indication.

Module 239 may start at least one executable component 122 identified in restart list 246 based on the determination of which executable components 122 to restart. For example, if modulo 239 determines that the amount of data communicated with network interface 110 has exited the threshold range, then module 239 may determine which of executable components 122 to start by obtaining a selection of previously disabled executable components 122 to disable from a user of computing device 200. In such examples, module 239 may display or otherwise output to a user, with output device 214, restart list 246 (i.e., the executable components 122 identified in restart list 246) via a communication 286.

After displaying restart list 246, module 239 may receive, via input device 216, a selection 288 of at least one of the executable components 122 identified in restart list 246 to restart. After receiving selection 288, module 239 may start each executable component 122 identified in selection 288. For example, when restart list 246 includes first and second executable components 122, as illustrated in the example of FIG. 2, selection 288 received via input device 216 may identify first executable component 122, as shown in the example of FIG. 2. Alternatively, if module 239 determines that the amount of data communicated with network interface 110 has exited the threshold range, then, in response, module 239 may start all of the executable components 122 identified in restart list 246 without receiving a selection of executable components via input device 216. As used herein, to "start" an executable component means to begin the execution of an executable component that is not currently running or paused, or to resume the execution of an executable component that is paused.

In the examples described above, the computing device may allow a user to select, from a list of running executable components, at least one executable component to disable in response to an accumulated amount of data communicated entering the threshold range. By allowing the user to select the executable components to disable, the computing device may reduce the rate of data usage in accordance with user's priorities when the amount of communicated data enters the threshold range. In this manner, the computing device may improve user experience by allowing the user to continue to run executable components most important to the user while allowing the user to disable less important and/or background executable components in order to reduce the rate of data consumption and thereby potentially prolong the usage of the network interface below the network interface usage limit. Additionally, in the examples described above, the computing device may store a list of disabled executable components for subsequent display to a user. In this manner, examples described above may improve the user experience by assisting a user, who may not recall all executable components previously disabled, to restart some or all of those executable components.

Figure 3:
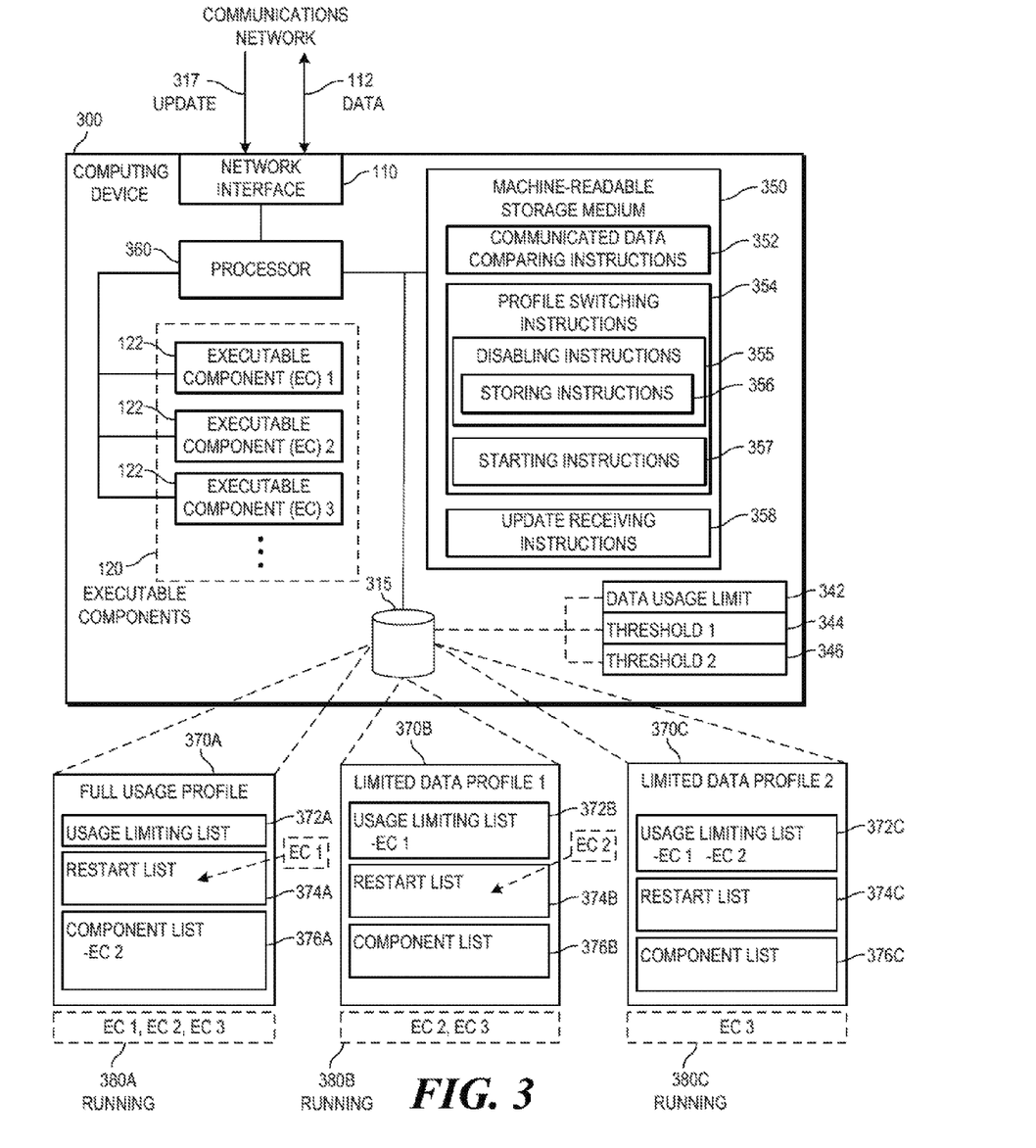
FIG. 3 is a block diagram of an example computing device for managing data usage in accordance with a plurality of usage profiles.

FIG. 3 is a block diagram of an example computing device 300 for managing data usage in accordance with a plurality of usage profiles. In the example of FIG. 3, computing device 300 includes a network interface 110 and a plurality 120 of executable components 122, as described above in relation to FIG. 1. As described above, network interface 110 may communicate data 112 with a communications network. Among the plurality 120, FIG. 3 illustrates first, second, and third executable components 122. Plurality 120 may include more or fewer executable components than the four illustrated in FIG. 3. In the example of FIG. 3, each executable component 122 of the plurality 120 is able to utilize network interface 110 to communicate data 112 between the executable component 122 and a communications network outside of computing device 300. Computing device 300 also includes a processor 360, a storage area 315, and a machine-readable storage medium 350.

As used herein, a "processor" may be at least one central processing unit (CPU), at least one semiconductor-based microprocessor, at least one graphics processing unit (GPU), at least one other hardware device suitable for the retrieval and execution of instructions stored on a machine-readable storage medium, or a combination thereof. Additionally, any processor described herein may include, for example, a single core on a chip, multiple cores on a chip, multiple cores across multiple chips, multiple cores across multiple devices, or a combination thereof. Additionally, as used herein, a "machine-readable storage medium" may be any electronic, magnetic, optical, or other physical storage device that contains, stores, or is otherwise encoded with executable instructions. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

Machine-readable storage medium 350 includes instructions 352, 354, 355, 356, 357, and 358 for managing data usage of computing device 300. In the example of FIG. 3, machine-readable storage medium 350 is separate from storage area 315. Alternatively, in some examples, machine-readable storage medium 350 may be a portion of storage area 315. In other examples, at least one of instructions 352, 354, 355, 356, 357, and 358 may be stored in storage area 315 instead of in machine-readable storage medium 350.

In the example of FIG. 3, processor 360 may fetch, decode, and execute the instructions of machine-readable storage medium 350 to implement the functionality described below. As an alternative or in addition to fetching, decoding, and executing instructions, processor 360 may include at least one integrated circuit (IC), at least one other electronic circuit, other control logic, or a combination thereof for performing some or all of the functionality of the instructions of machine-readable storage medium 360 described below.

In the example illustrated in FIG. 3, machine-readable storage medium 350 includes instructions for operating computing device 300 in accordance with a plurality of usage profiles. In some examples, each usage profile includes a usage limiting list, a restart list, and a component list. In such examples, for each profile, the usage limiting list indicates which executable components, if any, to disable when using the profile. In addition, for each profile, the restart list indicates which executable components, if any, were disabled when computing device 300 last switched from the profile to another profile, and the component list indicate which executable components, if any, are to be started when using the profile.

Machine-readable storage medium 350 includes instructions 352 for comparing are amount of data communicated with a network interface of the computing device to a network interface data usage limit for the computing device. In some examples, instructions 352 may monitor an amount of data communicated (e.g., uploaded and/or downloaded) with network interface 110 between with the communications network and computing device 300. For example, instructions 352 may monitor a total amount of data communicated with network interface 110. In some examples, this total may be reset (e.g., to zero) periodically. For example, the total may be reset at the beginning of a new billing cycle associated with a service provider, or when an additional amount of pre-paid data is purchased for use via computing device 300. In the ample of FIG. 3, a network interface data usage limit 342 is stored in storage area 315.

In some examples, instructions 352 may compare the total amount of data communicated with the network interface to network interface data usage limit 342. Based on this comparison, instructions 352 may determine whether the amount of data communicated with network interface 110 enters within a threshold range defined by a threshold. For example, instructions 352 may determine whether the difference between the total amount of data communicated and network interface data usage limit 342 is less than a threshold amount or a threshold percentage of the network interface data usage limit 342. If the difference is less than the threshold amount or percentage, then instructions 352 may determine that the total amount of data communicated has entered the threshold range of the network interface data usage limit.

Machine-readable storage medium 350 also includes profile switching instructions 354 for switching between usage profiles of computing device 300. In some examples, if instructions 352 determine that the amount of data communicated with network interface 110 has entered a threshold range, profile switching instructions 354 may access a first usage profile associated with the threshold range to operate computing device 300 in accordance with the first usage profile.

In the example of FIG. 3, profile switching instructions 354 include disabling instructions 355. In some examples, some 355 may be executed if instructions 352 determine that the amount of data communicated with the interface enters within a first threshold range of the network interface data usage limit. Instructions 355 may, for example, disable each executable component 122, if any, identified in the usage limiting list of the first profile. In other examples, in addition to disabling at least one executable component 122, instructions 355 may discontinue a functionality of at least one other executable component 122, wherein performance of the functionality of the at least one executable component 122 includes communicating data, with network interface 110, between the executable component 122 and a communications network. In the example of FIG. 3, disabling instructions 355 include storing instructions 356. In such examples, instructions 356 may store, in a restart list of a second usage profile, information identifying each executable component disabled in accordance with the usage limiting list of the first usage profile. In such examples, the second usage profile may be the usage profile used by computing device 300 before switching to the first usage profile.

Profile switching instructions 354 also include starting instructions 357. In some examples, instructions 357 may be executed if instructions 352 determine that the amount of data communicated with the interface enters within a first threshold range of the network interface data usage limit. In some examples, instructions 357 may start each executable component 122, if any, identified in the component list of the first usage profile and each executable component 122, if any, identified in the restart list of the first usage profile. In other examples, starting instructions may present the restart list of the first usage profile to a user and start any executable components 122 selected by the user in response, in addition to the executable components identified in the component list.

Machine-readable storage medium 350 also includes update receiving instructions 358, in some examples, instructions 358 may receive a data usage update 317 via network interface 110. In some examples, update 317 may indicate an increase in data usage limit 342 or request a reset (e.g., to zero) of the total amount of data communicated with network interface 110, as monitored by instructions 352. In such examples, instructions 358 may alter data usage limit 342 and/or the current value of the amount of data communicated with network interface 110. In some examples, after updating at least one of these values, instructions 352 may compare the amount of data communicated with the network interface to network interface data usage limit 342. After updating at least one of the values, instructions 352 may determine that the amount of data communicated with network interface 110 has exited (e.g., is outside of) the first threshold range.

In examples in which computing device 300 switched from the second to the first usage profile in response to entering the first threshold range, profile switching instructions 354 may switch computing device 300 from the first profile back to the second profile in response to determining that the amount of data communicated with network interface 110 has exited the first threshold range. In other examples, profile switching instructions 354 may switch from the first back to the second usage profile in response to detecting the availability of another network interface for accessing a communications network. For example, instructions 354 may switch back to the second profile when a WLAN is available via another network interface of computing device 300.

In the example of FIG. 3, computing device 300 may be operated in accordance with any one of a full usage profile 370A, a first limited usage profile 370B, and a second limited usage profile 370C. In some examples, each of profiles 370A, 370B, and 370C includes a usage limiting list, a restart list, and a component list. In other examples, computing device 300 may be operated in accordance with more or fewer profiles. In the example of FIG. 3, first and second thresholds 344 and 346 are stored in storage area 315, and computing device 300 may operate in accordance with full usage profile 370A when the amount of data communicated with network interface 110 is outside of a first threshold range defined by first threshold 344. Additionally, in the example of FIG. 3, computing device 300 may operate in accordance with first limited data profile 370B when the amount of data communicated with network interface 110 is within a first threshold range defined by first threshold 344, and in accordance with a second limited usage profile when the amount of data communicated with network interface 110 is within a second threshold range defined by second threshold 346. In such examples, the first and second thresholds, and thus the first and second threshold ranges, may be different. For example, the second threshold range may be within the first threshold range.

In one example, illustrated in FIG. 3, while computing device 300 is operating in accordance with full usage profile 370A, first, second, and third executable components 122 may each be running on computing device 300, as illustrated in block 380A. In this example, if instructions 352 determine that the amount of data communicated with network interface 110 enters within the first threshold range defined by first threshold 344, profile switching instructions 354 may switch computing device 300 from operating in accordance with full usage profile 370A to operating in accordance with first limited data profile 370B. Accordingly, in this example, disabling instructions 355 may disable each executable component 122 identified in usage limiting list 372B of profile 370B (e.g., first executable component 122). Additionally, storing instructions 356 may store information identifying each executable component 122 disabled based on list 372B (e.g., first executable component 122) in the restart list 374A of full usage profile 370A (i.e., the previously used profile).

Further, starting instructions 357 may start each executable component 122 identified in restart list 374B of profile 370B, which is initially empty in the example of FIG. 3, and each executable component 122 identified in component list 376B (e.g., none). Accordingly, as illustrated in block 380B of FIG. 3, in this example, the second and third executable components 12 may be running after switching to operating in accordance with first limited data profile 370B. In this manner, the example of FIG. 3 may reduce the rate at which computing device 300 communicates data by stopping execution of the first executable component 122 (e.g., a media streaming application, background service, etc.) when approaching the network interface data usage limit 342, while allowing second and third executable components 122 (e.g., e-mail client, web browser, etc.) to continue to run.

Moreover, in the example of FIG. 3, if instructions 352 subsequently determine that the amount of data communicated with network interface 110 enters within the second threshold range defined by second threshold 346, profile switching instructions 354 may switch from operating in accordance with first limited data profile 370B to operating in accordance with second limited data profile 370C. Accordingly, in this example, disabling instructions 355 may disable each executable component 122 identified in usage limiting list 372C of profile 370C, namely second executable component 122. While first executable component 122 is also identified in usage limiting list 372C of profile 370C, disabling Instructions 355 will only disable running executable components, which first executable component 122 is not as shown in block 380B. Additionally, storing instructions 356 may store information identifying each executable component 122 disabled in accordance with usage limiting list 372C (e.g., second executable component 122) in the restart list 374B of first limited usage profile 370B (i.e., the previously used profile).

Further, starting Instructions 357 may start each executable component 122 identified in restart list 374C of profile 370C and each executable component 122 identified in component list 376C of profile 370C, both of which are empty in the example shown in FIG. 3. Accordingly, as illustrated in block 380C of FIG. 3, in this example, the third executable components 122 may be running after switching to operating in accordance with second limited data profile 370C. In this manner, the example of FIG. 3 may further reduce the rate at which computing device 300 communicates data by stopping execution of the second executable component 122 (e.g., a web browser, etc.) when computing device 300 comes even closer to network interface data usage limit 342, while still allowing third executable components 122 (e.g., an e-mail client, etc.) to continue to run.

Additionally, in the example of FIG. 3, update receiving instructions may receive a data usage update 317 increasing network interface data usage limit 342 such that the amount of data communicated with network interface 110 is no longer within either the first or the second threshold range. Accordingly, in this example, when instructions 352 determine that the amount of data communicated with network interface 110 is outside of both the first and second threshold ranges, profile switching instructions 354 may switch from operating in accordance with second limited data profile 370C back to operating in accordance with full usage profile 370A. Accordingly, in this example, disabling instructions 355 may disable each executable component 122 identified in usage limiting list 372A of profile 370A, which is empty, so no executable component 122 is disabled. Additionally, storing instructions 356 may store information identifying each executable component 122 disabled based on list 372A (e.g., none) in the restart list 374C of second limited usage profile 370C (i.e., the previously used profile).

Further, starting instructions 357 may start each executable component 122 identified in restart list 374A of profile 370A (e.g., first executable component 122) and each executable component 122 identified in component list 376A of profile 370A (e.g., second executable component 122). Accordingly, as illustrated in block 380A of FIG. 3, in this example, the first, second, and third executable components 122 will be running after switching to operating in accordance with the fully usage profile 370A which, in this example, returns computing device 300 to a state in which all of the initially running executable components 122 are running again. In this manner, the example of FIG. 3 may restore all of the functionalities of computing device 300 when computing device 300 is sufficiently far from network interface data usage limit 342. In other examples, profile switching instructions 354 may, switch from operating in accordance with second limited data profile 370C to operating in accordance with full usage profile 370A in response to other conditions such as determining that a connection to a communications network is available through a network interface of computing device 300 other than network interface 110. Additionally, in other examples, when switching from a first to a second profile, all of the executable components running before the transition (including those disabled when switching from the first profile) may be stored in the restart list of the first profile so that, if the computing device switches back to the first profile (from the second or another profile), all of the executable components running when previously operating the computing device in accordance with the first profile may be started again when switching back to the first profile.

Figure 4:
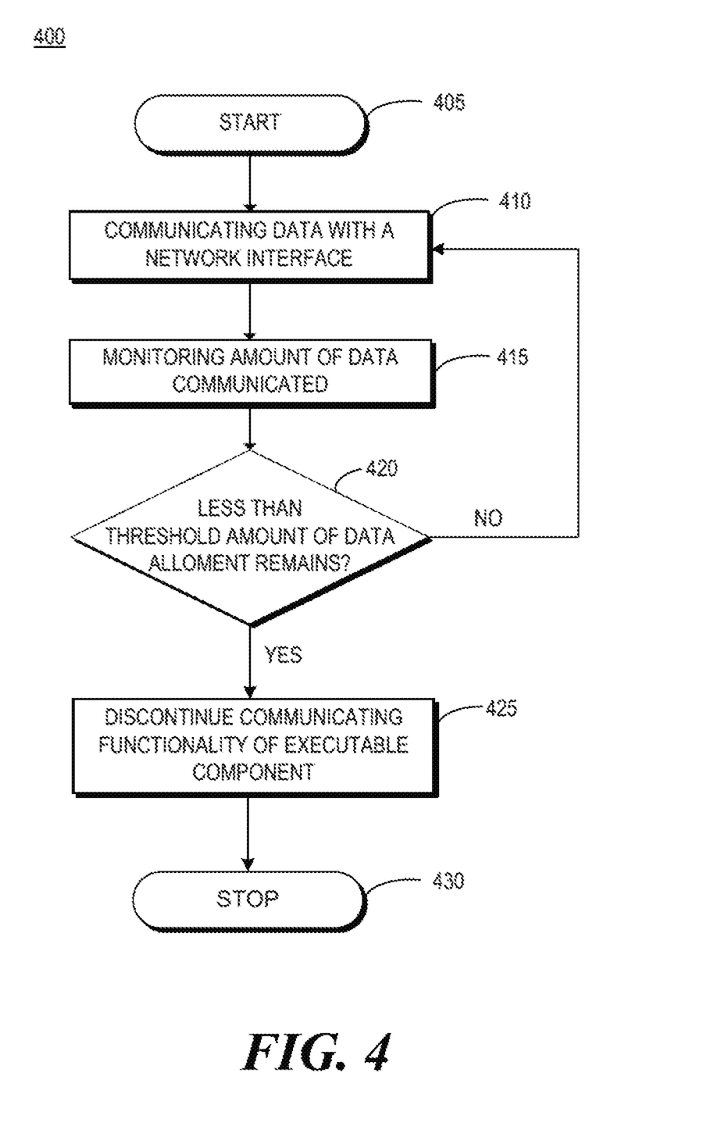
FIG. 4 is a flowchart of an example method for managing data usage of a computing device.

FIG. 4 is a flowchart of an example method 400 for managing data usage of a computing device. Although execution of method 400 is described below with reference to computing device 100 of FIG. 1, other suitable components for execution of method 400 can be utilized (e.g., computing device 200 or 300). Additionally, method 400 may be implemented in the form of executable instructions encoded on a machine-readable storage medium, in the form of electronic circuitry, or a combination thereof (e.g., as modules 132, 134, and 136).

Method 400 may start at 405 and proceed to 410, were computing device 100 may communicate data, with network interface 110 of computing device 100, between at least one remote resource of a communications network and at least one of a plurality 120 of executable components 122 running on computing device 100. Method 400 may proceed to 415, where computing device 100 may monitor an amount of data communicated with network interface 110. For example, monitoring module 132 of computing device 100 may monitor the amount of data communicated, as described above in relation to FIG. 1.

Method 400 may proceed to 420, where computing device 100 may determine if less than a threshold amount of data remains in a data allotment for computing device 100. In some examples, the data allotment may be a running total of the amount of data that may be communicated with network interface 110 before reaching a network interface data usage limit. In such examples, computing device 100 (e.g., monitoring module 132) may reduce the data allotment as computing device 100 communicates data with network interface 100. In such examples, computing device 100 reaches the network interface data usage limit when the data allotment reaches zero. If, at 420, computing device 100 determines that the amount of the data allotment remaining is not less than a threshold amount, then method 400 may proceed to 410.

If computing device 100 determines at 420 that less than a threshold amount of data allotment 420 remains, then method 400 may proceed to 425. At 425, computing device 100 may discontinue a functionality of at least one executable component 122 of the plurality 120 of executable components 122, wherein performance of the functionality of the at least one executable component 122 includes communicating data, with network interface 110, between the at least one executable component 122 and a communications network.

As used herein, "discontinuing a functionality" of an executable component means stopping and/or preventing further use of at least one aspect or task of an executable component, and/or disabling the executable component having the functionality. Examples of discontinuing a functionality of an executable component include preventing a web browser from accessing a particular website, file type (e.g., a file type that utilize a particular browser plug-in), or other remote resource. Other examples include stopping and/or preventing further operation of an updating function, polling function, or other function of an executable component that communicates with a communications network via a network interface.

In some examples, at 425, computing device 100 may discontinue a functionality that communicates via network interface 110 by accessing a list of at least one such functionality stored on computing device 100. In other examples, at 425, computing device 100 may prompt a user for a selection of which functionalities that communicate via network interface 110 to disable. Method 400 may then proceed to 430, where method 400 may stop.

Figure 5:
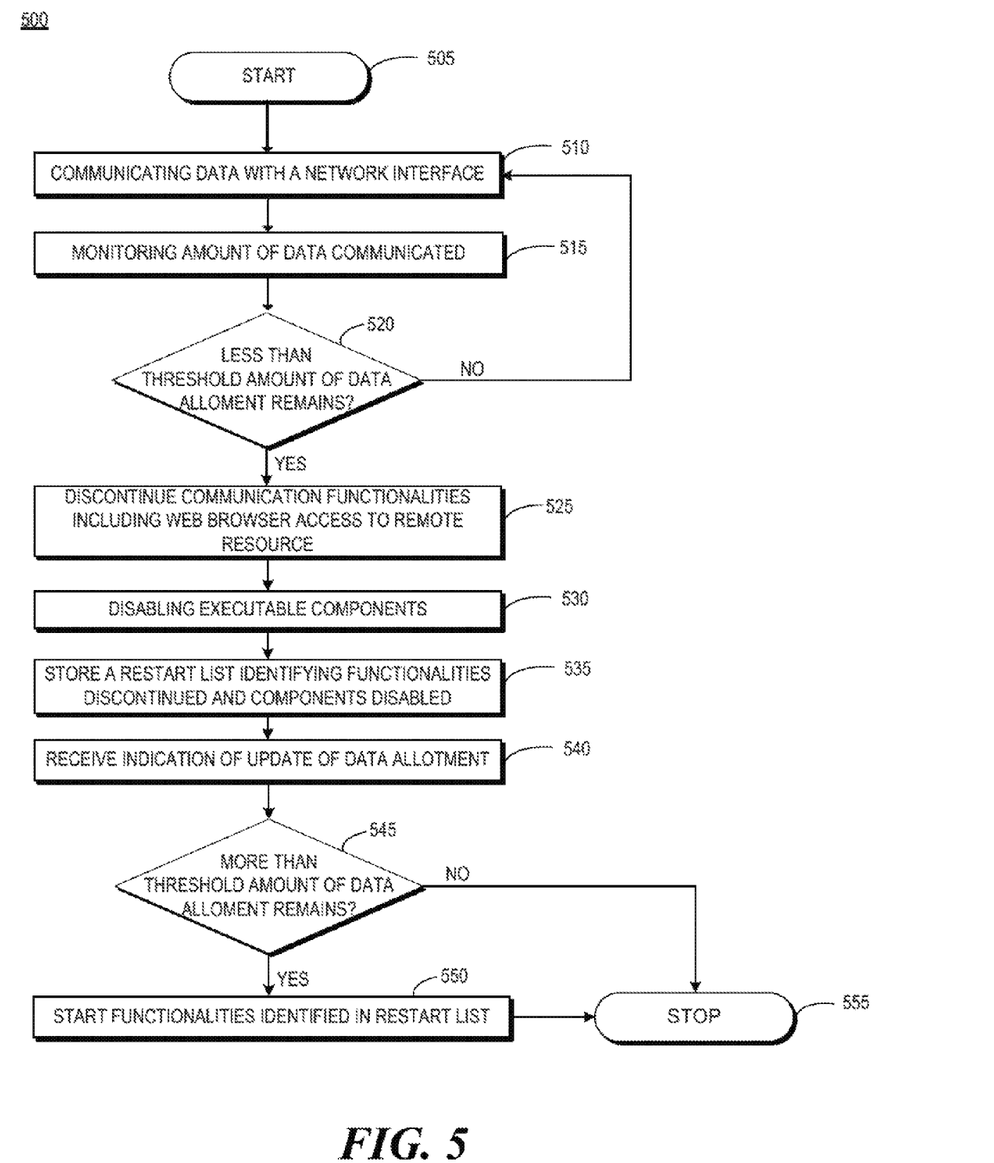
FIG. 5 is a flowchart of an example method for managing data usage of a computing device in accordance with a data allotment.

FIG. 5 is a flowchart of an example method 500 for managing data usage of a computing device in accordance with a data allotment. Although execution of method 500 is described below with reference to computing device 100 of FIG. 1, other suitable components for execution of method 500 can be utilized (e.g., computing device 200 or 300). Additionally, method 500 may be implemented in the form of executable instructions stored on a machine-readable storage medium, in the form of electronic circuitry, or a combination thereof.

Method 500 may start at 505 and proceed to 510, where computing device 100 may communicate data, with network interface 110 of computing device 100, between at least one remote resource of a communications network and at least one of a plurality 120 of executable components 122 running on computing device 100. Method 500 may proceed to 515, where computing device 100 may monitor an amount of data communicated with network interface 110. For example, computing device 100 may reduce a data allotment for computing device 100 in accordance with the amount of data communicated via network interface 110. Method 500 may proceed to 520, where computing device 100 may determine if less than a threshold amount of data remains in a data allotment for computing device 100. If not, then method 500 may proceed to 510.

If computing device 100 determines at 520 that less than a threshold amount of he data allotment remains, then method 500 may proceed to 525, where computing device 100 may discontinue a functionality of an executable component 122 of the plurality 120 of executable components 122, wherein the executable component 122 is a web browser and the functionality enables the web browser to access a particular remote resource (e.g., a particular web site). In some examples, computing device 100 may disable a plurality of functionalities of at least one executable component 122. In some examples, each of the disabled functionalities, when performed, includes communicating data, with network interface 122, between the at least one executable component 122 and a communications network.

After discontinuing at least one functionality, method 500 may proceed to 530, where computing device 100 may disable at least one executable component 122 of the plurality 120 of executable components 122. In the example of FIG. 5, the at least one executable component 122 is disabled if it is determined at 520 that less than the threshold amount of data remains in the data allotment.

After disabling the at least one executable component 122, method 500 may proceed to 535, where computing device 100 may store a restart list identifying each of the functionalities discontinued at 525 and each of the executable components 122 disabled at 530. At 540, computing device 100 may receive a data usage update. In some examples, the update may be an indication of an update of the data allotment for the use of network interface 110 by computing device 100. In such examples, the update may indicate to increase the data allotment such that computing device 100 may communicate more data with network interface 110 before reaching the network interface data usage limit. In some examples, prior to the update, less than the threshold amount of the data allotment may have remained, while updating the data allotment may increase the data allotment above the threshold amount.

After receiving the update at 540, computing device 100 may determine whether more than a threshold amount of data allotment remains at 545. If not, then method 500 may proceed to 555, where method 500 may stop. If computing device 100 determines at 545 that more than a threshold amount of the data allotment remains, then method 500 may proceed to 550. At 550, computing device 100 may start each functionality and each executable component 122 identified in the restart list. Accordingly, at 550, computing device 100 may start previously discontinued functionalities and previously disabled executable components 122 in accordance with the restart list. Method 500 may then proceed to 555, where method 500 may stop.

What is claimed is:

1. A computing device comprising:
   a storage medium to store a first profile comprising a first list of executable components and associated with a first threshold range, and a second profile comprising a second list of executable components and associated with a second threshold range different from the first threshold range;
   a network interface to communicate with a remote resource of a communications network;
   a plurality of executable components each to utilize the network interface to communicate data via the network interface with the remote resource of the communications network;
   an output device; and
   a data usage controller to:
      monitor an amount of data communicated with the network interface;
      disable the executable components of the first list in response to the monitored amount of data communicated with the network interface entering within the first threshold range of a network interface data usage limit for the computing device;
      switch from the first profile to the second profile in response to the monitored amount of data communicated with the network interface entering within the second threshold range of the network interface data usage limit; and
   in response to the switching, disable the executable components in the second list that include a given executable component not in the first list.

2. The computing device of claim 1, further comprising:
   a storage area to store a restart list identifying each executable component that the data usage controller has disabled.

3. The computing device of claim 2, wherein the output device is to display the restart list, and the computing device further comprises:
   an input device to receive a selection of at least one executable component identified in the restart list, wherein the data usage controller is to start the at least one executable component.

4. The computing device of claim 1, wherein each of the plurality of executable components is one of a computer application, a computer service, and a plug-in for a computer application.

5. The computing device of claim 1, wherein the data usage controller is to:
   further switch from the second profile to the first profile in response to the monitored amount of data communicated with the network interface exiting the second threshold range of the network interface data usage limit; and
   in response to the further switching, restart the given executable component.

6. The computing device of claim 1, wherein the network interface is a first network interface, the computing device further comprising a second network interface, and wherein the data usage controller is to restart a disabled executable component in response to determining that the computing device is able to communicate with a second communications network through the second network interface.

7. The computing device of claim 1, wherein the data usage controller is to:

reset the amount of data communicated with the network interface in response to start of a new billing cycle; and
restart a disabled executable component in response to the reset.

8. A non-transitory machine-readable storage medium storing instructions that upon execution cause a computing device comprising a plurality of executable components to:
compare, to a network interface data usage limit of a computing device, an amount of data communicated with a network interface of the computing device to a remote resource of a communications network, wherein a first profile comprises a first list of executable components and is associated with a first threshold range, and a second profile comprises a second list of executable components and is associated with a second threshold range different from the first threshold range;
disable the executable components of the first list in response to the amount of data communicated with the network interface entering within the first threshold range of the network interface data usage limit;
switch from the first profile to the second profile in response to the amount of data communicated with the network interface entering within the second threshold range of the network interface data usage limit; and
in response to the switching, disable the executable components in the second list that include a given executable component not in the first list.

9. The non-transitory machine-readable storage medium of claim 8, wherein the instructions upon execution cause the computing device to:
start at least one executable component, of the plurality of executable components, identified in a restart list of the first profile, in response to the amount of data communicated with the network interface exiting the first threshold range of the network interface data usage limit of the first profile.

10. The non-transitory machine-readable storage medium of claim 8, wherein the instructions upon execution cause the computing device to further:
further switch from the second profile to the first profile in response to the amount of data communicated with the network interface exiting the second threshold range of the network interface data usage limit; and in response to the further switching, restart the given executable component.

11. A method for managing data usage of a computing device including a network interface, the method comprising:
communicating data, with the network interface, between at least one remote resource and a plurality of executable components running on the computing device, wherein a first profile comprises a first list of executable components and is associated with a first threshold range, and a second profile comprises a second list of executable components and is associated with a second threshold range different from the first threshold range;
monitoring an amount of data communicated with the network interface;
disabling the executable components of the first list in response to the monitored amount of data communicated with the network interface entering within the first threshold range of a network interface data usage limit of the computing device;
switching from the first profile to the second profile in response to the monitored amount of data communicated with the network interface entering within the second threshold range of the network interface data usage limit and
in response to the switching, disabling the executable components in the second list that include a given executable component not in the first list.

12. The method of claim 11, further comprising:
receiving an indication of an update of data allotment; and
starting a disabled executable component when more than a threshold amount of data remains in the updated data allotment.

13. The method of claim 11, further comprising:
further switching from the second profile to the first profile in response to the monitored amount of data communicated with the network interface exiting the second threshold range of the network interface data usage limit; and
in response to the further switching, restart the given executable component.

* * * * *

UNITED STATES PATENT AND TRADEMARK OFFICE
CERTIFICATE OF CORRECTION

| | | |
|---|---|---|
| PATENT NO. | : 9,674,063 B2 | |
| APPLICATION NO. | : 14/347488 | |
| DATED | : June 6, 2017 | |
| INVENTOR(S) | : Robert W. Navarette et al. | |

It is certified that error appears in the above-identified patent and that said Letters Patent is hereby corrected as shown below:

In the Drawings

In sheet 4 of 5, reference numeral 420, Line 3, delete "ALLOMENT" and insert -- ALLOTMENT --, therefor.

In sheet 5 of 5, reference numeral 520, Line 3, delete "ALLOMENT" and insert -- ALLOTMENT --, therefor.

In sheet 5 of 5, reference numeral 545, Line 3, delete "ALLOMENT" and insert -- ALLOTMENT --, therefor.

In the Claims

In Column 18, Line 26 approx., in Claim 11, delete "limit" and insert -- limit; --, therefor.

Signed and Sealed this
Nineteenth Day of September, 2017

Joseph Matal
*Performing the Functions and Duties of the
Under Secretary of Commerce for Intellectual Property and
Director of the United States Patent and Trademark Office*